United States Patent
Tovey et al.

(10) Patent No.: US 11,481,256 B2
(45) Date of Patent: Oct. 25, 2022

(54) TASK GRAPH SCHEDULING FOR WORKLOAD PROCESSING

(71) Applicants: Advanced Micro Devices, Inc., Santa Clara, CA (US); ATI Technologies ULC, Markham (CA)

(72) Inventors: Steven J. Tovey, Milton Keynes (GB); Zhou Chen, Markham (CA); David Ronald Oldcorn, Milton Keynes (GB)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/888,540

(22) Filed: May 29, 2020

(65) Prior Publication Data
US 2021/0373957 A1    Dec. 2, 2021

(51) Int. Cl.
*G06F 9/48* (2006.01)
*G06F 9/50* (2006.01)
*G06F 9/52* (2006.01)

(52) U.S. Cl.
CPC .......... *G06F 9/5016* (2013.01); *G06F 9/4881* (2013.01); *G06F 9/522* (2013.01); *G06F 2209/486* (2013.01); *G06F 2209/501* (2013.01)

(58) Field of Classification Search
CPC ...... G06F 9/5016; G06F 9/4881; G06F 9/522; G06F 2209/486; G06F 2209/501; G06F 9/46–5083
See application file for complete search history.

(56) References Cited

U.S. PATENT DOCUMENTS

| 9,424,079 | B2 | 8/2016 | Rossbach et al. | |
|---|---|---|---|---|
| 9,465,770 | B2 | 10/2016 | Guerin et al. | |
| 9,652,286 | B2 | 5/2017 | Fan | |
| 9,984,037 | B1 | 5/2018 | Kavipurapu | |
| 10,861,126 | B1 * | 12/2020 | Sharma | G06F 9/4881 |
| 11,068,641 | B1 | 7/2021 | Wu et al. | |
| 2005/0192979 | A1 | 9/2005 | Keller et al. | |
| 2010/0257538 | A1 * | 10/2010 | Zhao | G06F 9/5033 718/106 |
| 2011/0321051 | A1 * | 12/2011 | Rastogi | G06F 9/4881 718/102 |
| 2013/0063460 | A1 * | 3/2013 | Marison | G06T 11/206 345/589 |
| 2013/0232495 | A1 | 9/2013 | Rossbach et al. | |

(Continued)

OTHER PUBLICATIONS

Exploiting Task Parallelism with OpenCL: A Case Study Pekka J "aaskel"ainen1 · Ville Korhonen, Matias Koskela1 · Jarmo Takala · Karen Egiazarian (Year: 2019).*

(Continued)

*Primary Examiner* — Emerson C Puente
*Assistant Examiner* — Paul V Mills
(74) *Attorney, Agent, or Firm* — Volpe Koenig

(57) ABSTRACT

Techniques for scheduling operations for a task graph on a processing device are provided. The techniques include receiving a task graph that specifies one or more passes, one or more resources, and one or more directed edges between passes and resources; identifying independent passes and dependent passes of the task graph; based on performance criteria of the processing device, scheduling commands to execute the passes; and transmitting scheduled commands to the processing device for execution as scheduled.

20 Claims, 12 Drawing Sheets

(56) References Cited

U.S. PATENT DOCUMENTS

| | | | |
|---|---|---|---|
| 2013/0332937 A1 | 12/2013 | Gaster et al. | |
| 2016/0357516 A1 | 12/2016 | Kogel et al. | |
| 2017/0109214 A1* | 4/2017 | Raman | G06F 16/9024 |
| 2017/0139680 A1 | 5/2017 | Proctor et al. | |
| 2018/0181446 A1 | 6/2018 | Bequet et al. | |
| 2018/0349145 A1 | 12/2018 | Tye et al. | |
| 2020/0090298 A1 | 3/2020 | Gould et al. | |
| 2020/0097333 A1 | 9/2020 | Jain et al. | |
| 2020/0301753 A1* | 9/2020 | Havlir | G06F 9/522 |
| 2020/0371843 A1 | 11/2020 | Garg et al. | |
| 2020/0401444 A1* | 12/2020 | Hirota | G06F 9/52 |
| 2021/0149734 A1* | 5/2021 | Gurfinkel | G06F 9/5027 |
| 2021/0294660 A1* | 9/2021 | Uralsky | G06F 9/4881 |

OTHER PUBLICATIONS

Simultaneous Multikernel GPU: Multi-tasking Throughput Processors via Fine-Grained Sharing Zhenning Wang, Jun Yang,Rami Melhem, (Year: 2016).*
Helium: A Transparent Inter-kernel Optimizer for OpenCL Thibaut Lutz, Christian Fensch, (Year: 2015).*
Concurrency in .NET: Modern patterns of concurrent and parallel programming Riccardo Terrell Chapter 7 (Year: 2018).*
Task Partitioning and Scheduling on Arbitrary Parallel Processing Systems Hesham El-Rewini Chapter 1-3, 5 (Year: 1989).*
Interactive Multi-Pass Programmable Shading Mark S. Peercy, Marc Olano, John Airey, P. Jeffrey Ungar (Year: 2000).*
Efcient Partitioning of Fragment Shaders for Multiple-Output Hardware Tim Foley, Mike Houston and Pat Hanrahan (Year: 2004).*

* cited by examiner

Task Graph Specification Program 600

- Pass Definition 605(1)
  - Resource Import/Export 608(1) | State Instructions 610(1)
  - Pass Commands 612(1)

- Pass Definition 605(2)
  - Resource Import/Export 608(2) | State Instructions 610(2)
  - Pass Commands 612(2)

- Pass Definition 605(3)
  - Resource Import/Export 608(3) | State Instructions 610(3)
  - Pass Commands 612(3)

- Control Flow Instructions 604(1)
  - Pass Invocation 606(1)
- Control Flow Instructions 604(2)
  - Pass Invocation 606(2)
- Control Flow Instructions 604(3)
  - Pass Invocation 606(3)

TASK GRAPH SCHEDULING FOR WORKLOAD PROCESSING

BACKGROUND

Three-dimensional ("3D") graphics processing pipelines perform a series of steps to convert input geometry into a two-dimensional ("2D") image for display on a screen. In some examples, these steps are specified as commands by a host such as a central processing unit running an application. Many rendering workloads require large sequences of commands, and thus generating and processing these sequences is a complex task.

BRIEF DESCRIPTION OF THE DRAWINGS

A more detailed understanding can be had from the following description, given by way of example in conjunction with the accompanying drawings wherein:

FIGS. 6A-6B illustrate generation of a task graph from a task graph specification program, according to an example technique;

DETAILED DESCRIPTION

Techniques for scheduling operations for a task graph on a processing device are provided. The techniques include receiving a task graph that specifies one or more passes, one or more resources, and one or more directed edges between passes and resources; identifying independent passes and dependent passes of the task graph; based on performance criteria of the processing device, scheduling commands to execute the passes; and transmitting scheduled commands to the processing device for execution as scheduled.

Figure 1:
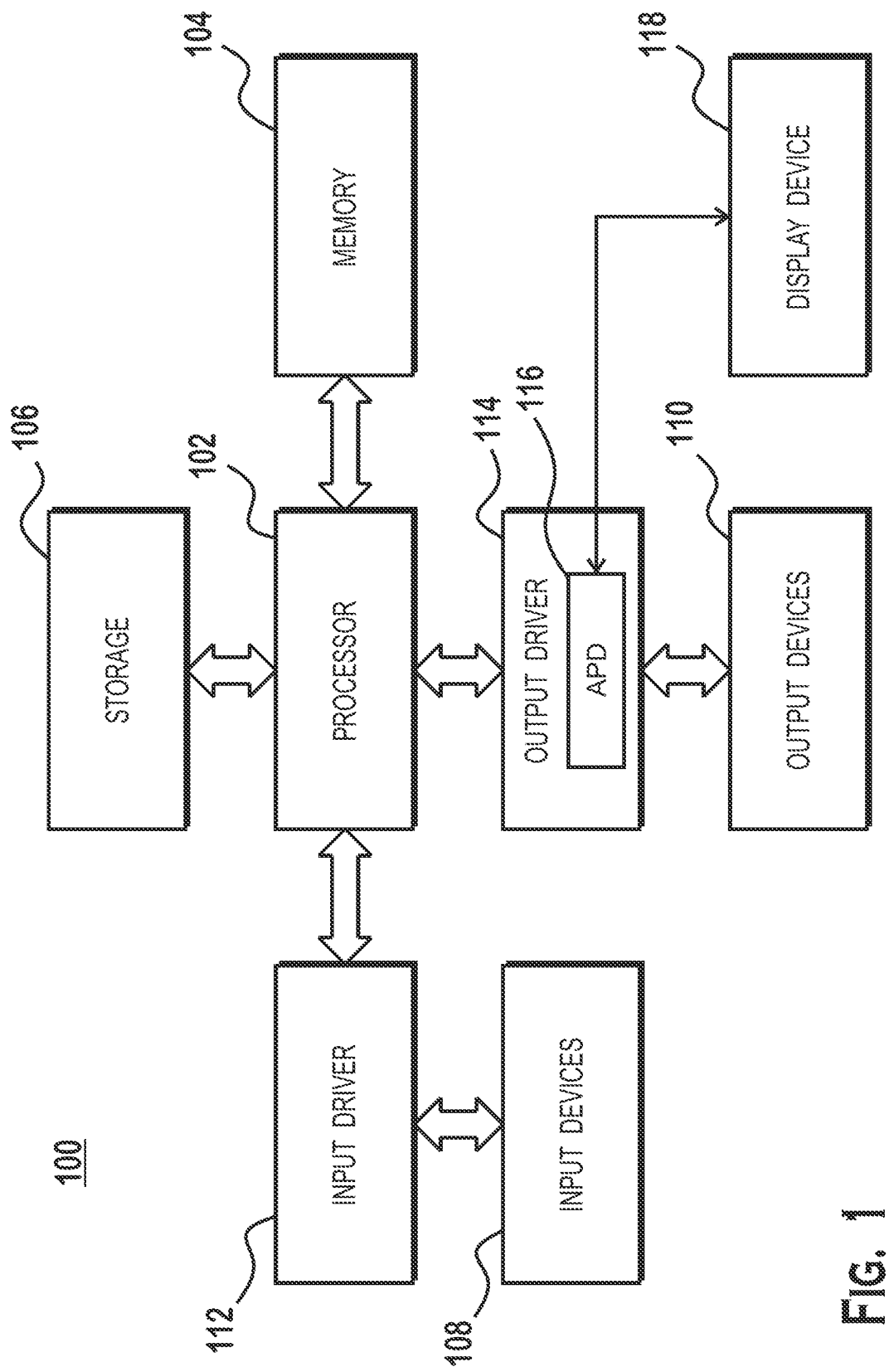
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
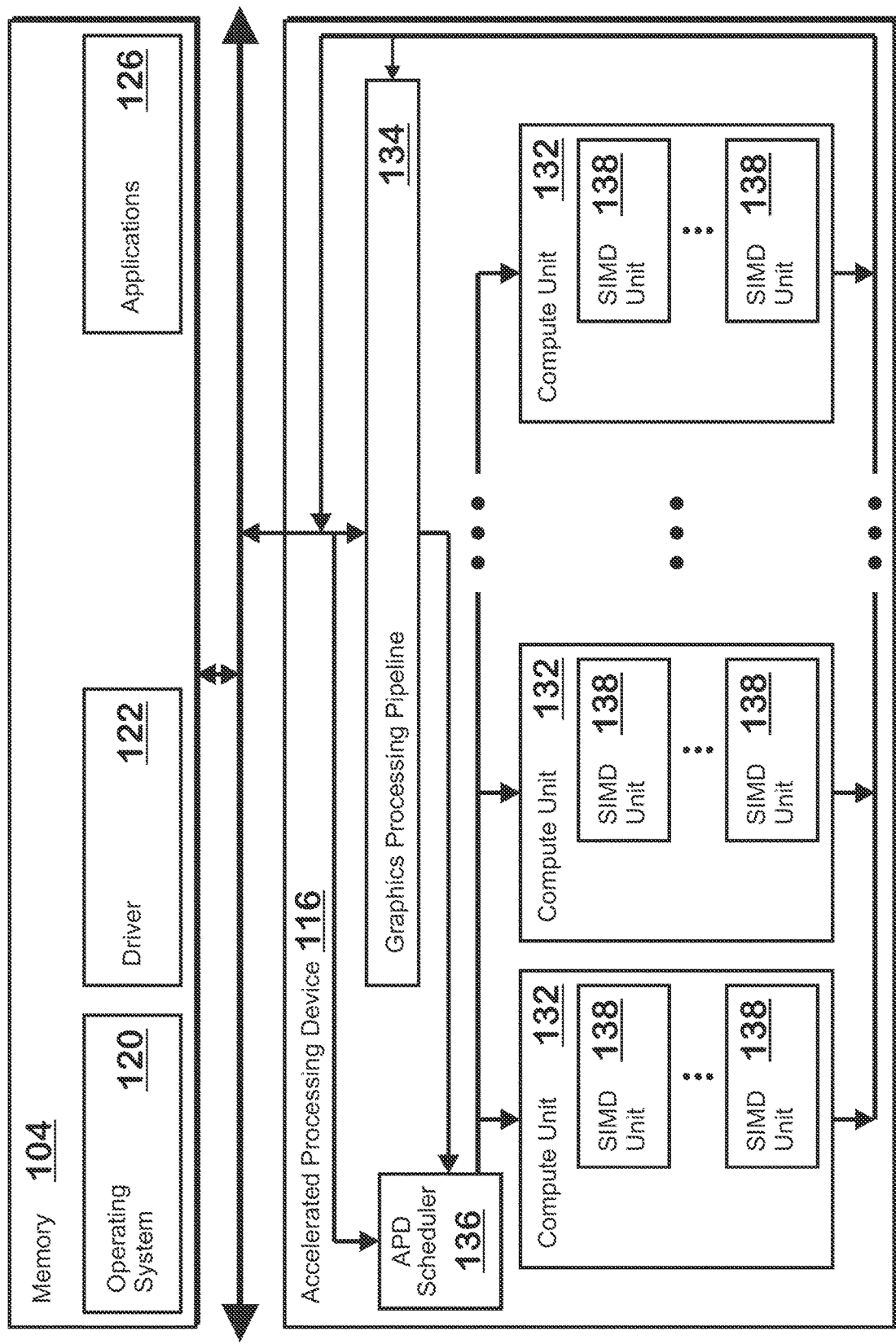
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
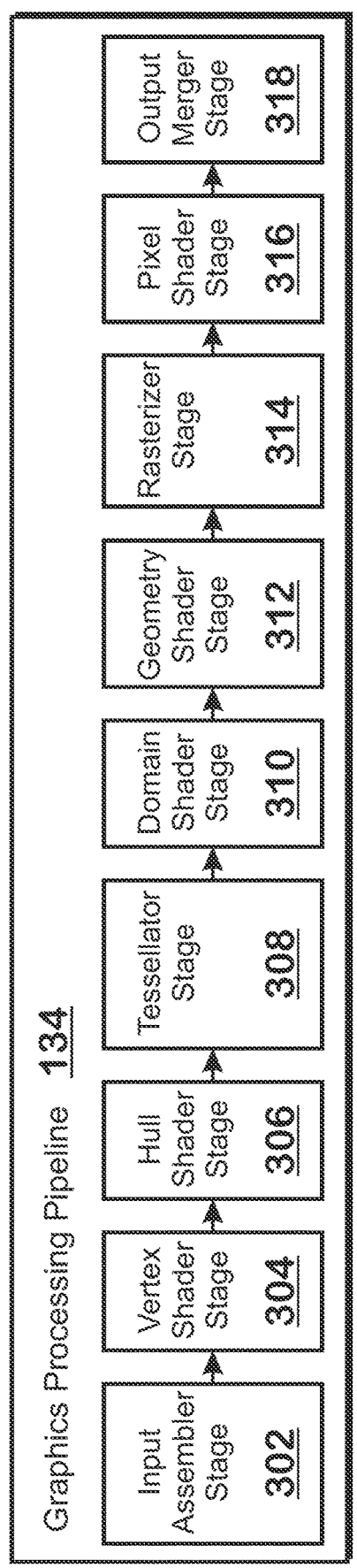
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Often, processing workloads on the APD 116 involve performing multiple "passes." A "pass" is a unit of processing that accepts some input (e.g., from another pass or as input to the entire processing workload), processes the input, and generates output. Some outputs include outputs to other passes, and other outputs include the final output of the processing workload, such as an image to display on a screen. Thus the particular order of passes, the inputs those passes use, and the outputs those passes generate, specifies an entire processing workload.

One example of a pass is processing of data through the graphics processing pipeline 134 configured in a particular way (e.g., with particular stages enabled or disabled, with particular programmable stages have particular selected shader programs for execution). The input or output for any particular pass through the graphics processing pipeline 134 is configurable based on the specified operations of the graphics processing pipeline 134. Example graphics processing passes include a geometry pass that draws meshes to a set of render targets and a depth buffer, and a post processing pass that draws a screen space quad with a vertex and pixel shader program. Another example of a pass is a compute workload executing a particular compute shader program. A compute shader program is a shader program that executes on the compute units 132 but not as part of the graphics processing pipeline 134. A compute workload is the execution of a compute shader program for a particular set of input data to generate a particular set of output data.

It is possible to "manually" specify each of the individual commands of the passes of a processing workload. More specifically, it is possible for an application 126 (or other entity such as the driver 122) to issue commands to the driver 122 and/or accelerated processing device 116 to perform the passes in an ad-hoc manner. However, the present disclosure presents techniques for more automated ways to specify multi-pass processing workloads.

Figure 4A:
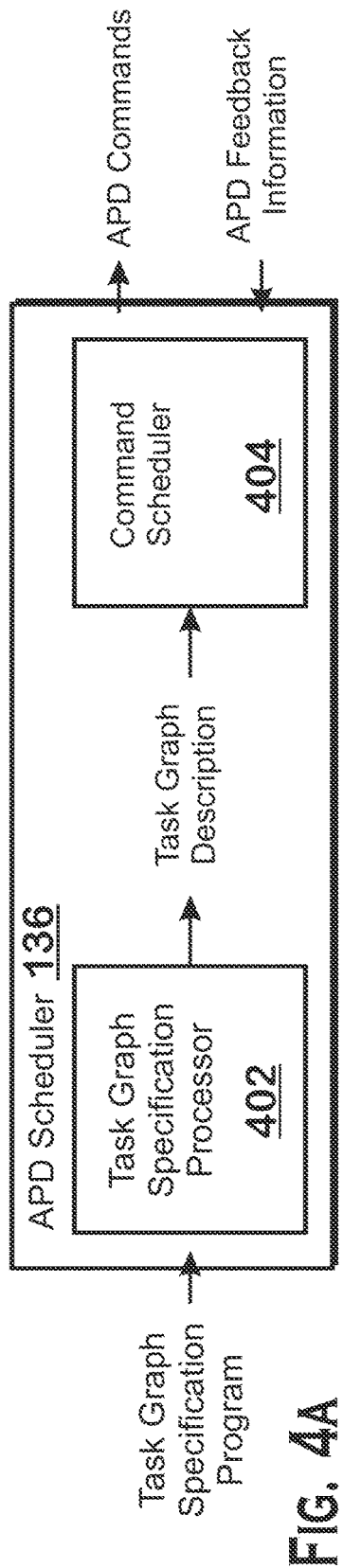
FIGS. 4A-4C illustrate configurations for a task graph specification processor 402 and a command scheduler 404 for generating task graphs and scheduling workloads on a processing device such as the accelerated processing device of FIG. 2.

Specifically, the present disclosure presents techniques for programmatically specifying processing workloads as task groups. FIG. 4A illustrates the APD scheduler 136 of FIG. 2, configured to execute task graph specification programs to generate task graphs and to schedule operations for execution on the APD 116 based on the generated task graphs.

The APD scheduler 136 includes a task graph specification processor 402 and a command scheduler 404. The task graph specification processor 402 accepts as input a task graph specification program. A task graph specification program programmatically specifies how to generate a task graph that describes processing workload. The processing workload includes a graph of tasks and resources as will be further described herein (for instance with respect to FIG. 5). The task graph specification processor 402 executes the task graph specification program, which, when executed, generates a task graph that specifies a processing workload as a task graph.

The command scheduler 404 accepts the task graph as input, performs scheduling of operations to perform the processing workload specified by the task graph, and directs the APD 116 to perform those operations. In some implementations, the command scheduler 404 accepts APD feedback information and uses that feedback information to schedule the operations on the APD 116. The APD feedback information includes various information about the status of the APD 116, such as performance metrics, occupancy metrics, resource utilization, and other types of information. Some example items of information about the status of the APD 116 includes time stamps when work enters and is completed by the graphics processing pipeline 134, hardware performance counters of the SIMD units 138, the percentage of time that various hardware units such are busy, and memory bandwidth utilization. The command scheduler 404 utilizes the time stamps to evaluate the overall effectiveness of the scheduling of tasks. In addition, the time stamps indicate overall duration of passes 502. Thus in some implementations, the command scheduler 404 prioritizes longer passes when scheduling. The hardware block utilization counters are used to help group passes that are bottlenecked at different hardware blocks together to achieve better overall utilization. In some examples, the command scheduler 404 is part of the APD 116 and is able to obtain such performance metrics directly from other components of the APD without intervention by a processor 102, an application, a driver, or an operating system.

Figure 4B:
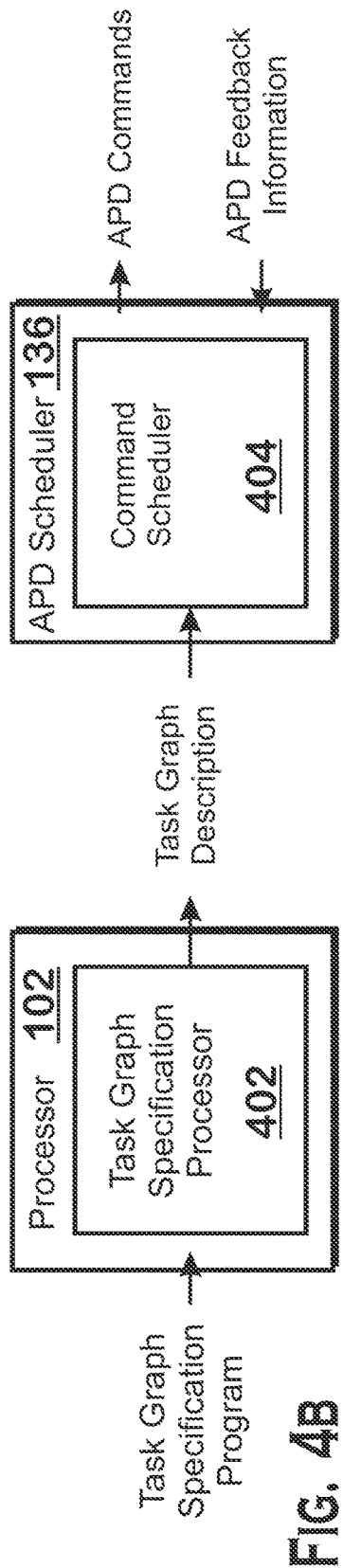
Figure 4C:
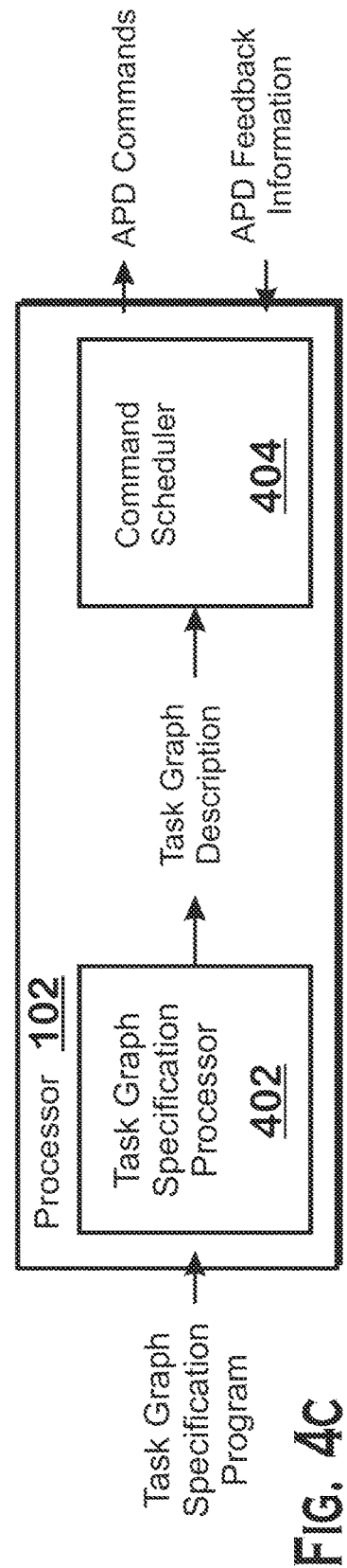

In the example of FIG. 4A, any or both of the task graph specification processor 402 and the command scheduler 404 are implemented as software executing on a processor, hardware circuitry configured to perform the operations described herein, or a combination thereof. Although described as two separate units, the task graph specification processor 402 and the command scheduler 404 are, in some implementations, the same unit. FIG. 4A illustrates an example where the task graph specification processor 402 and the command scheduler 404 are within the APD 116. FIG. 4B illustrates an example where the task graph specification processor 402 is software executing on the processor 102 and the command scheduler 404 is implemented within the APD 116 as described with respect to FIG. 4A. FIG. 4C illustrates an example where the task graph specification processor 402 and the command scheduler 404 are programs executing on the processor 102.

Although the command scheduler 404 is described as outputting commands for execution on the APD 116, it should be understood that the techniques described herein could be applied to generate commands for execution on a processor other than the APD 116, such as a central processing unit (e.g., the processor 102) or another unit.

Figure 5:
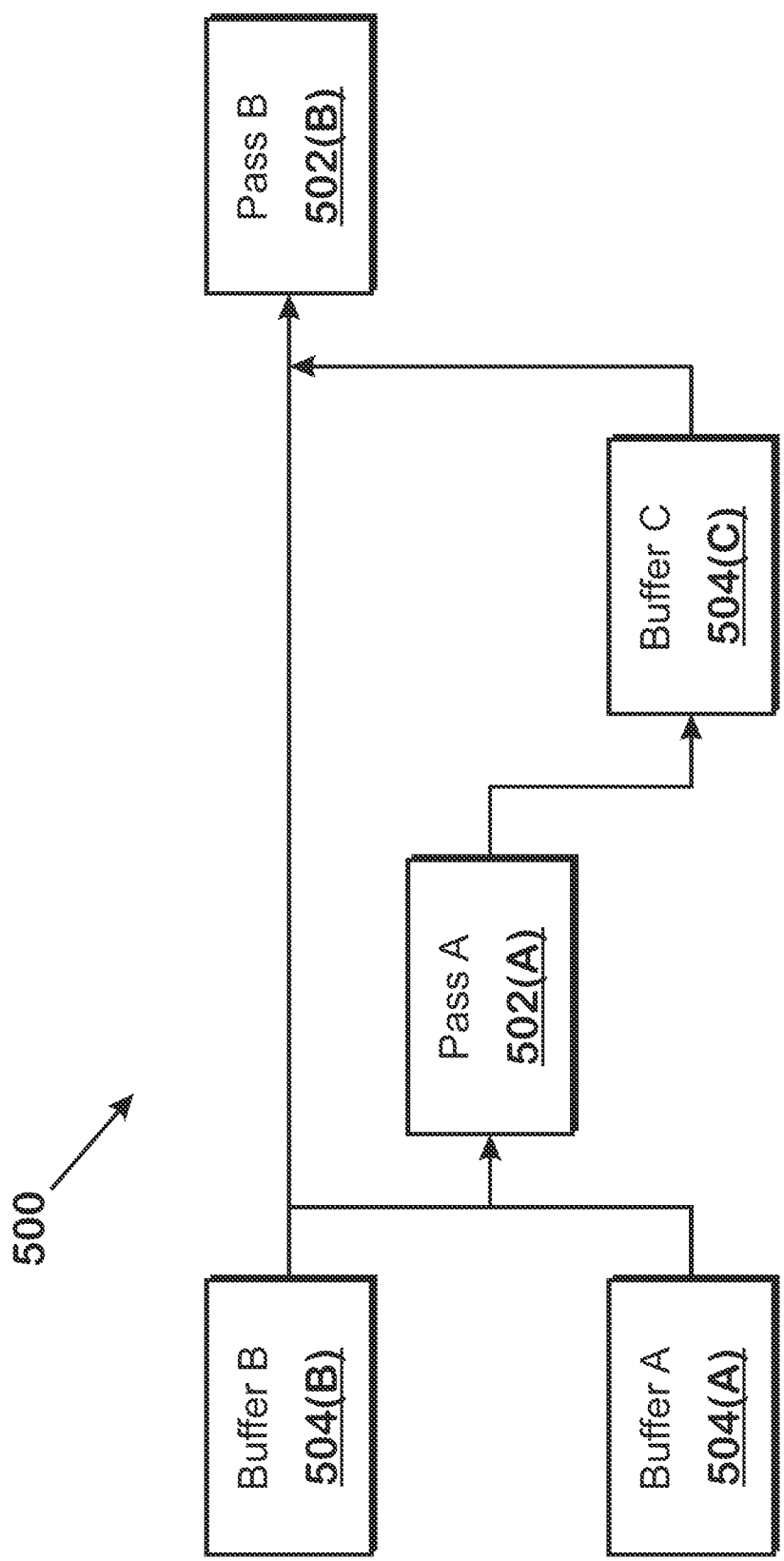
FIG. 5 illustrates an example task graph.

FIG. 5 illustrates an example task graph 500. The task graph 500 specifies a processing workload as a directed acyclic graph of passes 502 and buffers 504. The passes 502, as described above, include specific units of work such as processing of certain data through the graphics processing pipeline 134 configured in a specific manner, or compute shader programs. The buffers 504 include data that are used as input for passes 502 and/or as output for passes 502. A buffer 504 can be an input to one pass 502 and an output to another pass or can be an input or output to the entire processing workload (which corresponds to a single task graph). Some examples of buffers include images produced by a particular pass 502 through a graphics processing pipeline 134, data generated by a compute shader program, or data other than images generated by a pass 502 through a graphics processing pipeline 134.

The task graph 500 includes arrows between passes 502 and buffers 504. An arrow from a buffer 504 to a pass 502 means that the pass 502 accepts the data in that buffer 504 as input. An arrow from a pass 502 to a buffer 504 means that the pass 502 produces the data in the buffer 504 as output. The task graph 500 thus specifies dependencies between passes 502. More specifically, a pass 502 that accepts a buffer 504 generated by another pass 502 as input must wait to execute until that buffer 504 has actually been generated. Thus passes 502 that accept buffers 504 as input are dependent on other passes 502 that produce those buffers 504 as output. A first pass 502 is also considered dependent on a second pass 502 if a third pass 502 is dependent on the second pass 502 and the first pass 502 is dependent on the third pass 502. In other words, dependencies propagate through the arrows of the task graph 500. Two passes 502 are independent if neither is dependent on the other.

As described above, the task graph specification program is a program that specifies how to construct a task graph 500. Thus a task graph specification program indicates what passes 502 are to occur and which buffers 504 are the inputs and outputs of the passes 502. The task graph specification program is able to consider runtime data, such as user-defined runtime data, data generated by the APD 116, or other data, in making decisions regarding whether to include certain passes 502 and/or buffers 504 in the task graph 500 and how the passes 502 consume and/or produce the buffers 504. Thus the task graph specification program is not just a static description of a task graph 500 that gets evaluated by the task graph specification processor 402. Instead, the task graph specification program is able to variably construct the task graph 500 based on runtime parameters.

Figure 6B:
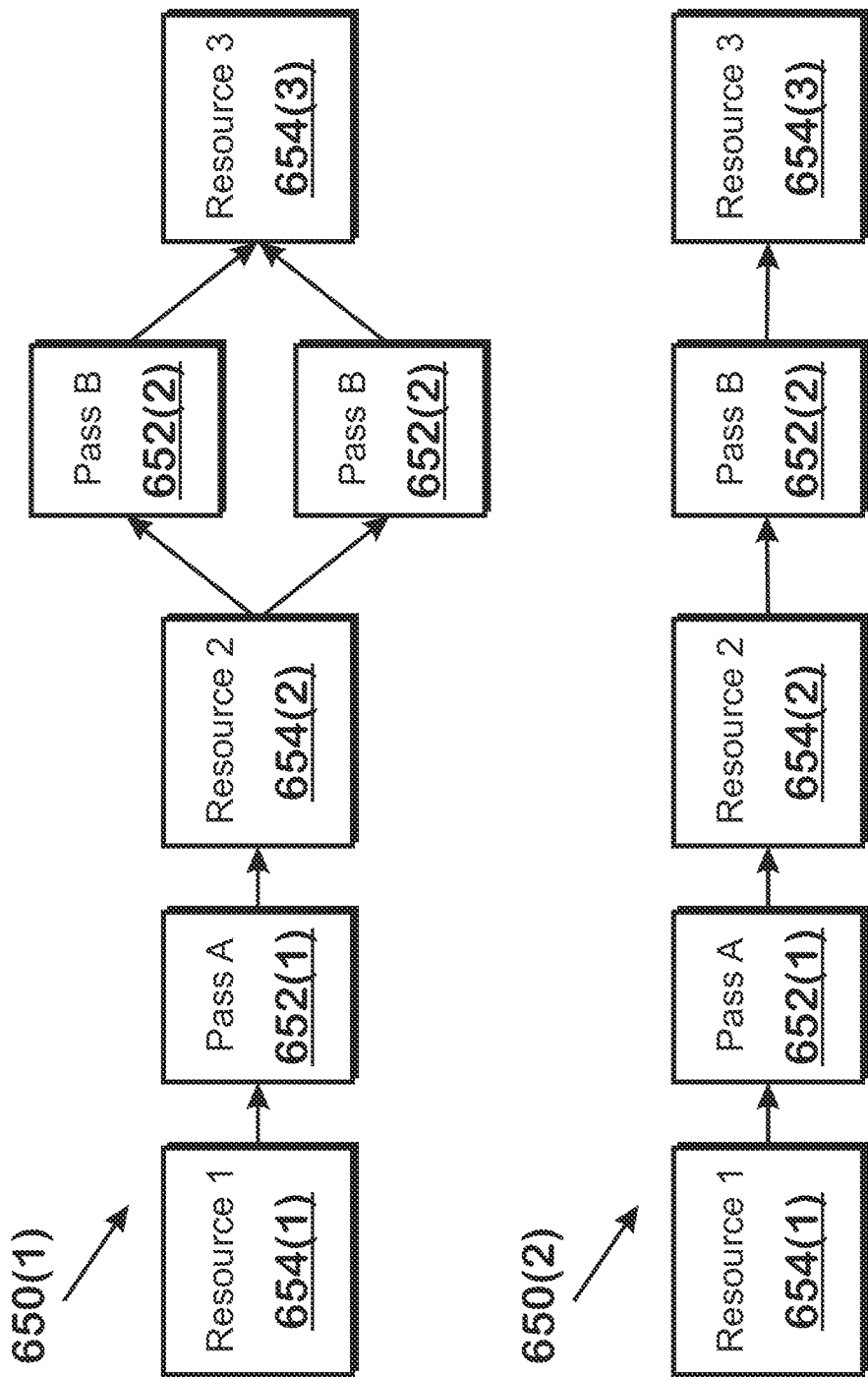
Figure 7A:
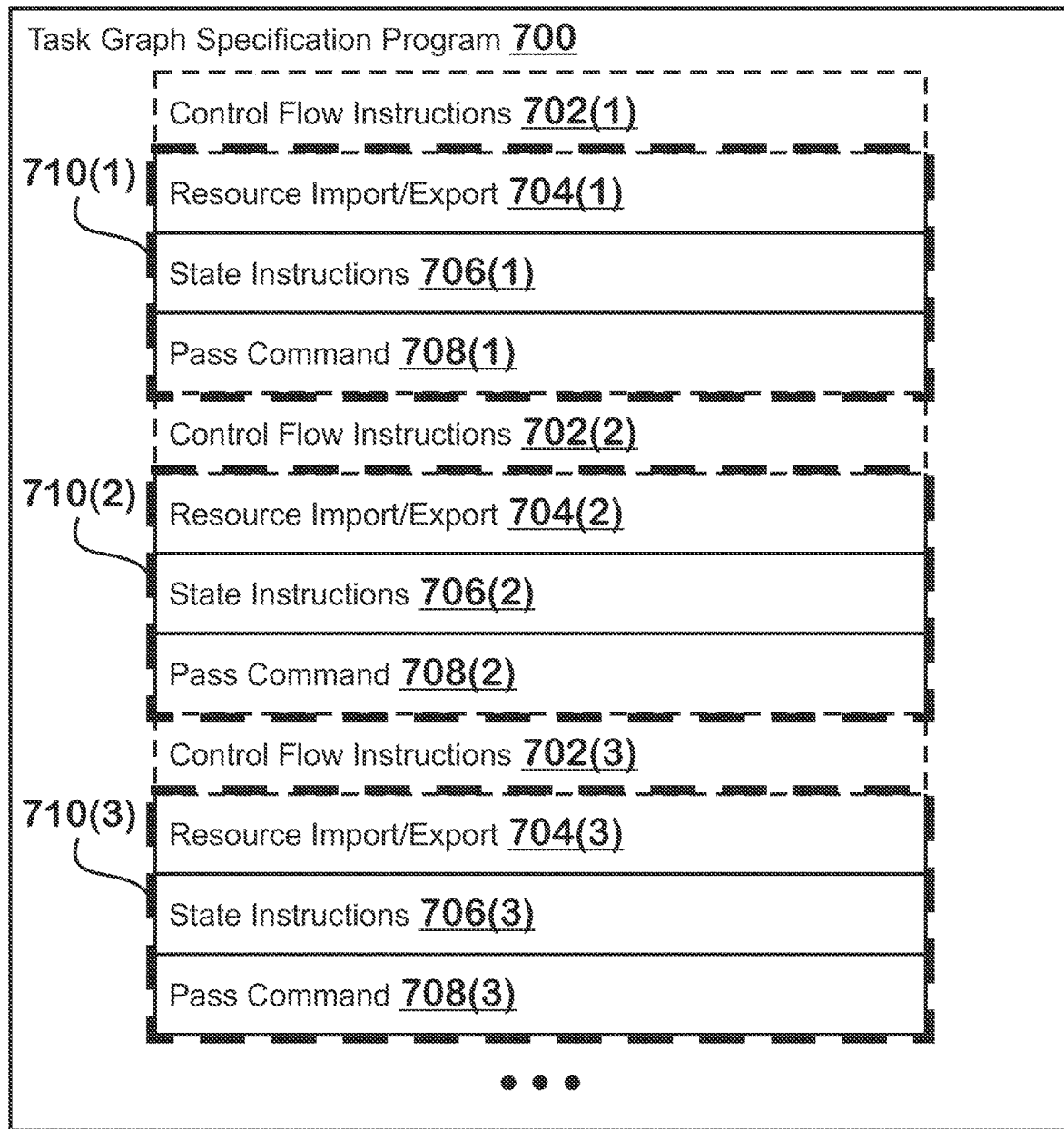
FIGS. 7A-7B illustrate generation of a task graph from a task graph specification program, according to another example technique.
Figure 7B:
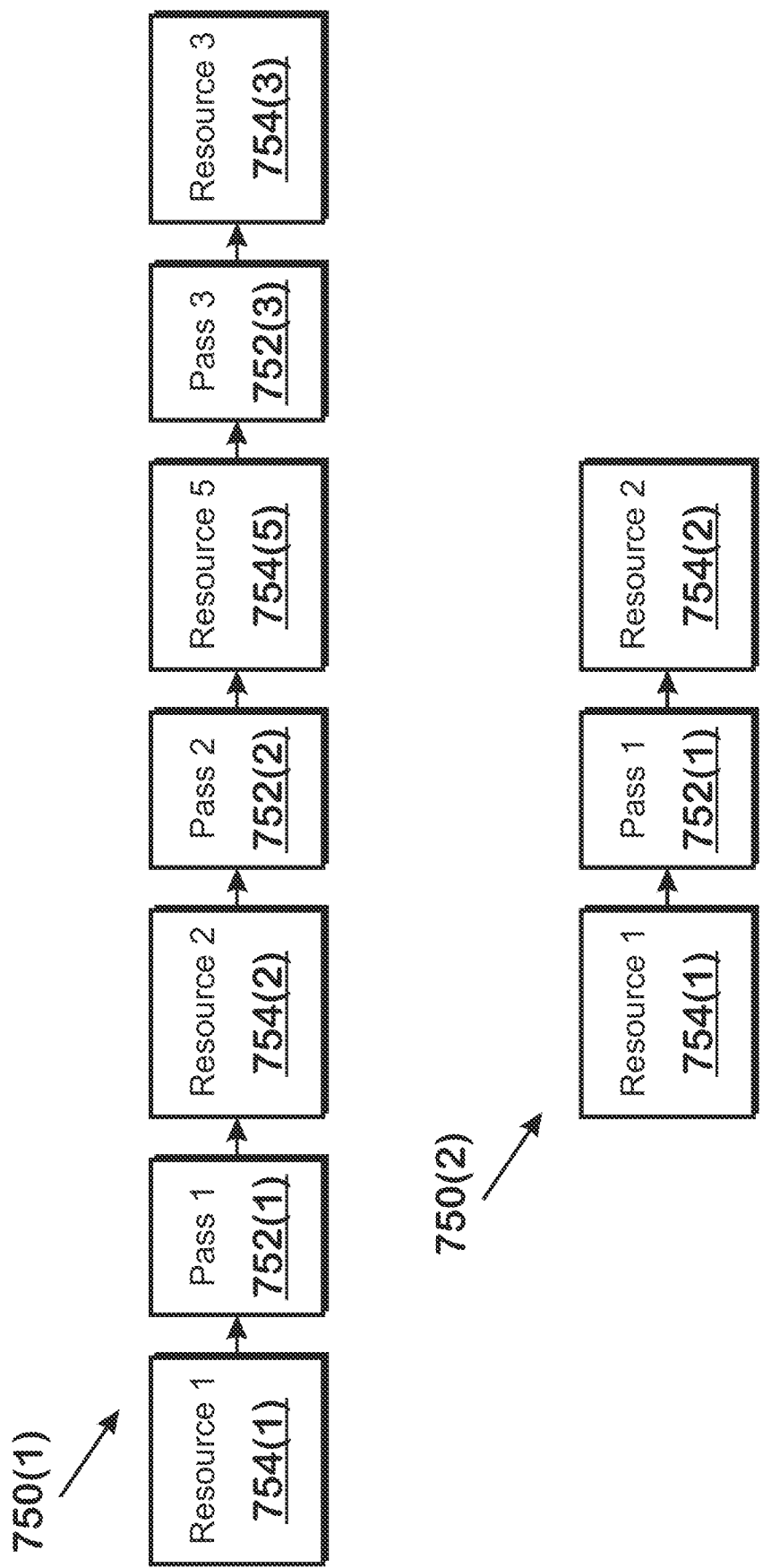

FIGS. 6A and 6B illustrate one example task graph specification program format, and FIGS. 7A and 7B illustrate an alternative task graph specification program format. In FIG. 6A, a task graph specification program includes pass definitions 605, pass invocations 606, and program control flow instructions 604. The pass definitions 605 define the operations and manner involved in execution of the passes on the APD 116. The pass invocations 606 represent instructions to the task graph specification processor 402 to generate a pass 502 for the task graph 500 that is output. The control flow instructions 604 are instructions for controlling when and how the pass invocations 606 are to be made. As described above, the task graph specification processor 402 executes the control flow instructions 604 and the pass invocations 606 to construct a task graph 500 for scheduling by the command scheduler 404 and execution by the APD 116.

In some implementations, the pass definitions 605 include resource import/export instructions 608, state instructions 610, and pass commands 612. In some implementations, the pass definitions 605 omit the state instructions 610. Resource import/export instructions 608 specify one or more resources that are imported (read) and/or exported (written) by the pass definition 605 when executed on the APD 116. The term "resource" has the same meaning as the term "buffer" (i.e., buffer 504 of FIG. 5). In some implementations, the state instructions 610 indicate one or both of which shaders are to be used for graphics or compute operations for the pass when executed on the APD 116 or what graphics pipeline state is to be used for the pass when executed on the APD 116, but other state is contemplated as well. The pass commands 612 are the actual work performed for the pass 606. The pass commands 612 input from the one or more imported resources, process those one or more imported resources, and output to the one or more exported resources. In some implementations, the pass commands 612 include commands such as draw commands (to draw geometry by, for example, sending the geometry through the graphics processing pipeline 134 of a particular configuration), dispatch commands (to dispatch general purpose compute workloads for execution), copy commands (to copy one or more portions of memory to one or more other locations), clear commands (to clear one or more portions of memory), resource layout transitions (to modify the layout of one or more resources), cache actions (to flush or prefetch cache data), synchronization operations (such as synchronization between APD 116 hardware blocks or events; for example, a draw command and a dispatch command might compete for memory bandwidth, so despite the fact that these items can run in parallel logically, a programmer sometimes inserts an explicit synchronization command to force one to start only after the other has completed.), or other commands executable by the APD 116. For cache actions and synchronization operations, the command scheduler 404 is able to, and sometimes does, generate such actions/operations automatically. However, a programmer may also explicitly specify these actions.

The control flow instructions 604 control program flow of the task graph specification program 600 during execution by the task graph specification processor 402. Control flow instructions 604 include control flow instructions such as conditional statements (for example, if-statements), loops, and the like. The control flow instructions 604 allow the task graph specification program 600 to build, at runtime, a task graph 500 based on runtime parameters. Loops allow the generation of multiple passes 502 from a single pass definition 605, each with possibly different parameters (import/export data, and shader/pipeline configuration). Conditionals are able to specify whether a particular node definition 605 is actually ever instantiated as a node.

In some situations, the pass invocations 606 specify arguments for one or more of the resource import/export instructions 608 or the state instructions 610. In such situations, the arguments specify one or more of what state (e.g., shader program, graphics processing pipeline 134 configuration) to use for the particular pass generated as the result of a pass invocation 606, one or more resources to import to the pass generated as the result of a pass invocation 606, or one or more resources to export from the pass generated as the result of a pass invocation 606. Further, in some situations, the arguments are specified as variables, meaning that the value of the argument is decided at runtime (for example, based on data available to the task graph specification program 600 and/or as the result of specific results from control flow instruction 604 execution). In sum, the arguments, and thus the state, import data, and export data, are elements that are specifiable at runtime (that is, the time of running the task graph specification program 600, meaning that the programmer who writes the task graph specification program 600 does not need to hard-code such information).

FIG. 6B illustrates an example task graph 650 generated based on a task graph specification program 600 of the format described in FIG. 6A. An example task graph specification program, illustrated in code, is now provided:

TABLE 1

Example task graph specification program

```
//Pass Definitions
PassA(resource: reada1, write a2)
{
    SetState(State1);
    SetResource(shader_resource: a1, render_target: a2);
    Draw1( );
}
PassB(resource: read b1, write b2)
{
    SetState(State2);
    SetResource(shader_resource: b1, render_target: b3);
    Draw2( );
    //Draw 3 inputs data output by Draw2
    SetResource(shader_resource: b3, render_target: b2);
    Draw3( );
}
//Pass Invocations
PassA(r1, r2);
if(A == true)
{
    PassB(r2, r3);
}
if(B == true)
{
    PassB(r2, r3);
}
```

The above task graph specification program specifies two pass definitions: one for PassA, which calls Draw1(), and one for PassB, which calls Draw2() and Draw3(). The pass invocations instantiate PassA on the graph as inputting resource r1 and outputting resource r2. Based on certain conditions, the pass invocations instantiate zero, one, or two instances of PassB, inputting resource r2 and outputting r3. Note that Draw3() uses data generated by Draw2() internally, but that this data is not specified as a resource due to the data being generated and consumed completely within PassB.

FIG. 6B illustrates two different task graphs 650 generated from two different executions of the task graph specification of table 1. In the first task graph 650(1), both condition A and condition B are true. Therefore, the graph generated includes PassA 652(1) which reads from resource 1 654(1) and outputs to resource 2 654(2), and two instances of PassB 652(2), which both read from resource 2 654(2) and output to resource 3 654(3) exist. For task graph 650(2), only condition A is true. Thus only one instance of PassB 652(2) is generated.

FIGS. 7A and 7B illustrate a task graph specification program 700 according to another format, and a task graph 750 generated as a result of execution of the task graph specification program 700 by the task graph specification processor 402.

The task graph specification program 700 includes control flow instructions 702, resource import/export instructions 704, state instructions 706, and pass commands 708. The pass commands 708 are individual commands executable by the APD 116. Some example pass commands 708 include A resource import/export instruction 704 draw commands (to draw geometry by, for example, sending the geometry through the graphics processing pipeline 134 of a particular configuration), dispatch commands (to dispatch general purpose compute workloads for execution), copy commands (to copy one or more portions of memory to one or more other locations), clear commands (to clear one or more portions of memory), resource layout transitions (to modify the layout of one or more resources), cache actions (to flush or prefetch cache data), synchronization operations (such as synchronization between APD 116 hardware blocks or events; for example, a draw command and a dispatch command might compete for memory bandwidth, so despite the fact that these items can run in parallel logically, a programmer sometimes inserts an explicit synchronization command to force one to start only after the other has completed.), or other commands executable by the APD 116. For cache actions and synchronization operations, the command scheduler 404 is able to, and sometimes does, generate such actions/operations automatically. However, a programmer may also explicitly specify these actions.

The resource import/export commands 704 specify resources that are read and/or written by a pass command 708. The state instructions 706 are instructions that define and/or modify the state of the APD 116 (such as graphics processing pipeline 134 state, which shader programs are used for the graphics processing pipeline 134 or a compute shader dispatch, or other state). The control flow instructions 702 control program flow as the task graph specification processor 402 executes the task graph specification program 700.

During execution, the task graph specification processor 402 traverses the task graph specification program 700 to identify pass blocks 710, from which the task graph specification program 700 generates passes 502 for a corresponding task graph. In some examples, a pass block 710 is a portion of the task graph specification program 700 that includes one (or a specified number) of pass commands and terminates with a pass command, and does not include control flow instructions for execution by the task graph specification processor 402. In other examples, a pass block 710 includes a different fixed number of pass commands 708, or a variable number of pass commands 708. In some examples, a pass block 710 does not need to terminate with a pass command 708. In some examples, the task graph specification processor 402 identifies portions of a task graph specification program 700 that include at least one pass command 708 and terminate with a pass command 708 and divides each such portion based on the location of the pass command 708 into pass blocks 710. More specifically, from the portions, the task graph specification program 700 generates one pass block 710 per specified number of pass commands 708. In some examples, each such pass block 710 includes all instructions from the previous pass block 710 to the last pass command 708 in the pass block 710, but without the control flow instructions 702.

With the pass blocks 710 identified, the task graph specification processor 702 generates a task graph 500 as follows. Each pass block 710 includes definitions of one or more import resources and one or more output resources. These resources constitute the buffers 504 of the task graph. The resource reads and writes constitute the directed edges of the task graph. An edge directed to a pass 502 from a buffer 504 is a resource read and an edge directed from a pass 502 to a buffer 504 is a resource write.

The following table includes an example code listing for a task graph specification program of the format described in FIG. 7A. FIG. 7B illustrates an example task graph 750 generated from the program.

TABLE 2

Example task graph specification program

```
//Start Pass Block 1
SetState(State1);
SetResource(read: r1, write: r2);
//Pass Command
Draw1( );
//End Pass Block 1
if(A == true)
{
    //Start Pass Block 2
    SetState(State2);
    SetResource(read: r2, write: r5);
    //Pass Command
    Draw2( );
    //End Pass Block 2
    //Start Pass Block 3
    SetResource(read: r5, write: r3);
    //Pass Command
    Draw3( );
    //End Pass Block 3
}
}
```

In this example, pass blocks include only one pass command. Pass commands are identified as commands that are one of a set of commands specified as being pass commands, such as those described elsewhere herein. In other words, the task graph specification processor 402 has access to a list of command types that are considered pass commands and identifies all commands of the program that are found within the list as pass commands. The example task graph specification program of Table 2 includes three different pass blocks. The first pass block is the portion from the SetState (State1) statement to the first pass command Draw1(). The second pass block is the portion in the if-statement that starts with the SetState(State2) statement and ends at the Draw2() pass command. The third pass block is the portion in the if-statement that starts with SetResource(read: r5, write: r3) and ends with Draw3().

In one example execution of the task graph specification program of Table 2, illustrated as task graph 750(1), condition B is true. Thus the task graph specification processor 402 generates passes in the task graph 750(1) including pass 1, which inputs resource 1 754(1) and outputs resource 2 754(2), pass 2, which inputs resource 2 754(2) and outputs resource 5 754(5), and pass 3, which inputs resource 5 754(5) and outputs resource 3 754(3).

In another example execution of the task graph specification program of Table 2, illustrated as task graph 750(2), condition B is false. Thus the task graph specification processor 402 generates pass 1, which inputs resource 1 754(1) and outputs resource 2 754(2) 754(2), but does not generate passes 2 or 3.

As described above, the command scheduler 404 schedules tasks for execution on the APD 116 based on a task graph output by the task graph specification processor 402. The command scheduler 404 determines the order of execution of the passes based on certain considerations. One set of considerations includes the dependencies of the passes 502. More specifically, passes 502 that have one or more dependencies cannot be reordered with respect to each other. For example, if a first pass 502 is dependent on a second pass 502, then the command scheduler 404 causes the first pass 502 to execute after the second pass 502 has completed. In some examples, the command scheduler 404 inserts an appropriate instruction or marker, such as a barrier instruction or primitive, to enforce ordering between passes 502. If a first pass 502 is not dependent on a second pass 502 and the second pass is not dependent on the first pass 502, then the command scheduler 404 is free to, and in some situations, does, order the execution of the first pass 502 and the second pass 502 with respect to each other in any technically feasible manner. For examples, in some instances, the command scheduler 404 causes independent passes to execute one after the other, and in other instances, the command scheduler 404 causes independent passes to execute during at least partially overlapping time periods. Often, the command scheduler 404 selects passes 502 to execute together in order to optimize certain desired resources such as memory usage, processing unit resources, register usage, or to minimize execution time.

Figure 8A:
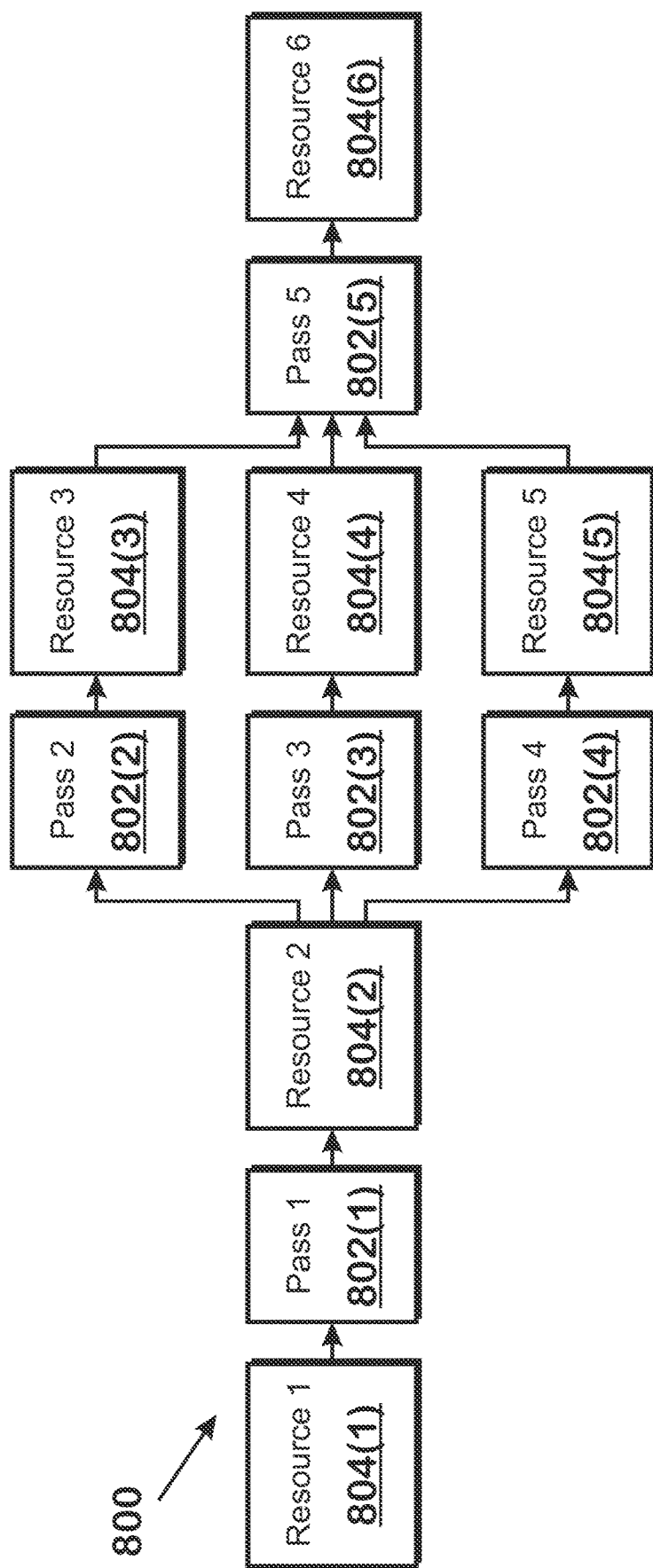
FIGS. 8A-8B illustrate scheduling tasks on a processing device according to a task graph.

FIG. 8A illustrates a task graph 800 according to an example. A first pass 802(1) reads resource 1 804(1) and outputs resource 2 804(2). Pass 2 802(2) inputs resource 2 804(2) and outputs resource 3 804(3). Pass 3 802(3) inputs resource 2 804(2) and outputs resource 4 804(4). Pass 4 802(4) inputs resource 2 804(2) and outputs resource 5 804(5). Pass 5 inputs 802(5) and outputs resource 6 804(6).

Pass 2 802(2), pass 3 802(3), and pass 4 802(4) are independent and are dependent on pass 2 802(1). Pass 5 802(5) is dependent on pass 1 802(1), pass 2 804(2), pass 3 802(3), and pass 4 802(4). Because pass 2 802(2), pass 3 802(3), and pass 4 802(4) are independent, the command scheduler 404 is able to reorder the execution of these passes 802 with respect to each other. However, the command scheduler 404 enforces ordering between dependent passes, meaning that pass 1 402(1) executes before pass 2 802(2), pass 3 802(3), and pass 4 802(4), and pass 2 802(2), pass 3 802(3), and pass 4 802(4) execute before pass 5 802(5).

Figure 8B:
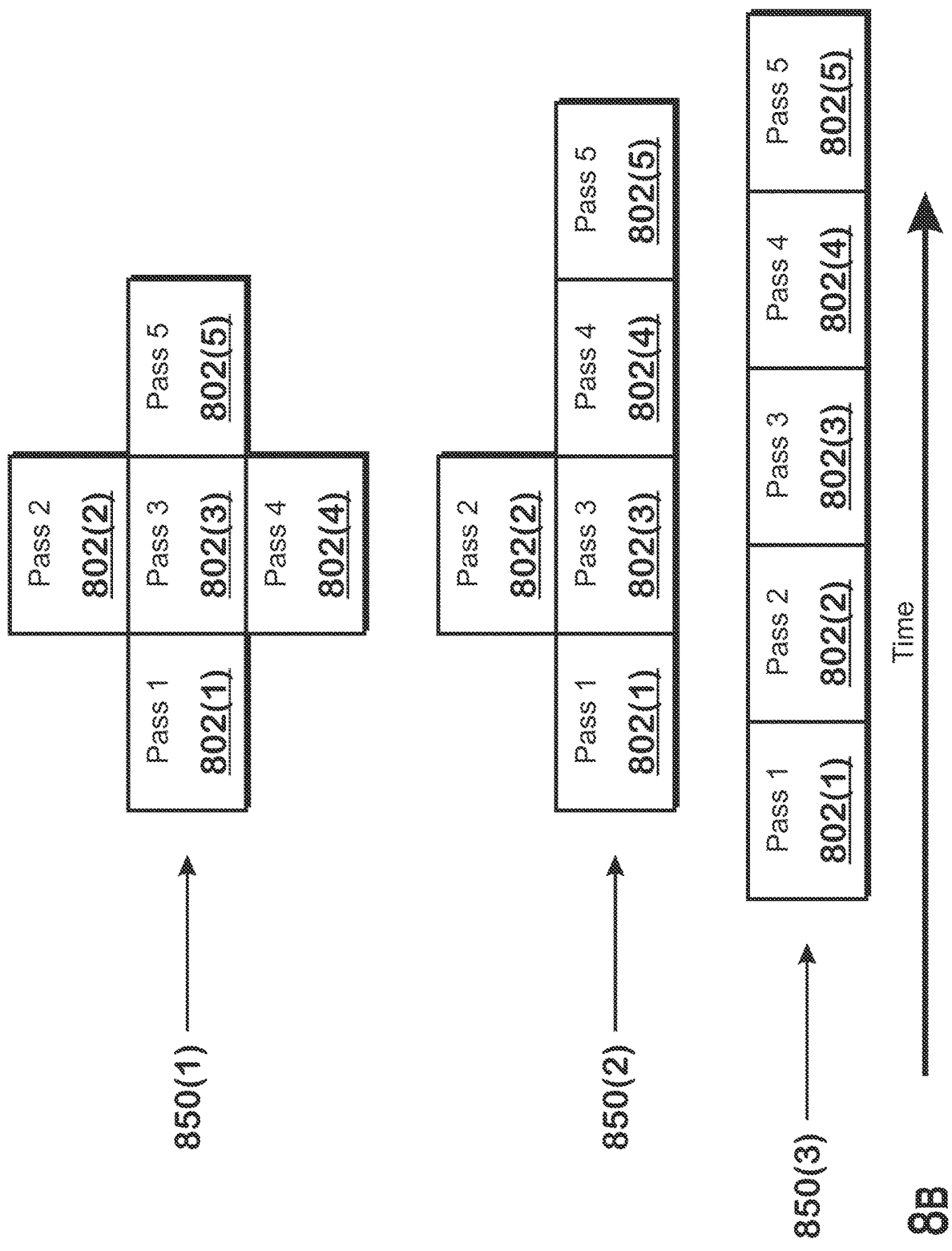

FIG. 8B illustrates example execution orders 850 of the passes 802 as scheduled by the command scheduler 404. Time proceeds to the right, as shown. In example 1 850(1), pass 1 802(1) executes before pass 2 802(2), pass 3 802(3), and pass 4 802(4), and pass 2 802(2), pass 3 802(3), and pass 4 802(4) execute simultaneously. In example 2 850(2), pass 1 802(1) executes before pass 2 802(2) and pass 3 802(3). Pass 4 802(4) executes after pass 2 802(2) and pass 3 802(3) and executes before pass 5 802(5). In example 3 850(3), the passes 802 execute sequentially.

In some implementations, a specific programming language is used for the entire task graph specification program for the technique of FIGS. 7A and 7B and for the control flow instructions 604 and pass invocations 606 of FIGS. 6A and 6B (but not for the pass definitions 605). In such implementations, in the example of FIGS. 6A and 6B, the pass definitions 605 are written in a different programming language which is compiled. These pass definitions 605 are invoked by the APD 116 when the corresponding pass is executed.

In order to determine how to schedule independent passes 802, the command scheduler 404 considers the state of the APD 116 and performance metrics of the passes 802. There are a number of different items of information that constitute the "state" of the APD 116. Some examples of performance metrics include resource usage and execution speed. Resources include memory, registers, and processing units (such as SIMD units 138). In some examples, the command scheduler 404 records performance metrics of passes 802 during execution for use during scheduling of the same passes 802 in the future. More specifically, the command scheduler 404 updates estimated resource usage data for particular passes based on previously witnessed resource usage for those passes, and utilizes such updated estimated resource usage data to make scheduling decision in the future.

As described above, the command scheduler 404 sometimes schedules independent passes 502 for execution simultaneously on one or more compute units 132. The command scheduler 404 determines whether to schedule different passes 502 simultaneously based on the nature of the passes 502 and the capabilities and state of the APD 116. More specifically, in some situations, it is advantageous to schedule independent passes 502 simultaneously and in other situations, it is advantageous to schedule independent passes 502 non-simultaneously. The term "simultaneously" means that two (or more) passes 502 execute in at least partially overlapping time periods.

Passes 502 consume resources such as memory, processing units (e.g., SIMD units 138), registers, and the like. Thus in situations where the APD 116 is limited in certain resources, and executing passes 502 simultaneously would exceed the number of available resources, the command scheduler 404 does not schedule such passes 502 simultaneously. Conversely, in situations where resources are available for simultaneous execution, the command scheduler 404 sometimes schedules such passes 502 simultaneously. In addition, in operation, the command scheduler 404 determines whether to emphasize aspects such as speed or resource usage and schedules independent passes 502 based on such determination. In an example, executing multiple passes 502 simultaneously reduces the total execution time for those passes 502 but increases total resource usage at any given time. Executing multiple passes 502 serially increases total execution time but reduces total resource usage at a given time. Conversely, executing multiple passes 502 simultaneously reduces total execution time but increases total resource usage at a given time.

Another consideration for the command scheduler 404 is whether different passes 502 use different resources. More specifically, if different passes 502 use different types of resources, or if one pass 502 uses a low amount of a particular resource and another pass 502 uses a high amount of a resource, then it would be beneficial to schedule those passes together. In an example, one pass 502 has very heavy usage of the SIMD units 138 while another pass 502 has light usage of the SIMD units 138. In this situation, in some instances, the command scheduler 404 schedules these two passes for execution simultaneously.

In addition, the command scheduler 404 is able to reduce memory usage at a given time by reducing the period of time during which a particular buffer 504 is used. More specifically, by analyzing the task graph 500, the command scheduler is able to determine a lifetime of any particular buffer 504. The lifetime of a buffer 504 is the period of time between the pass 502 that generates that buffer 504 and the last pass 502 that consumes that buffer 504. In some implementations, and in some situations such as where memory usage is high, the command scheduler 404 minimizes the lifetime of buffers 504 by scheduling simultaneously passes 502 whose completion tends towards ending that lifetime. In other words, to reduce the lifetime of a buffer 504, the command scheduler 404 identifies passes 502 that are a possible last pass 502 to use a buffer 504, and the command scheduler 404 identifies passes 502 that a possible last pass 502 is dependent on. Then, the command scheduler 404 attempts to schedule such identified passes 502 for execution simultaneously where possible (e.g., independent passes 502 can be scheduled for execution simultaneously). A "possible last pass" is either the pass that is the last pass, in topological sort order, to use the buffer 504, or one of the independent passes 502 that could be the last pass, in topological sort order, to use the buffer 504. It is also possible to use this technique to keep the resource working set to stay in a particular part of the memory hierarchy, such as a cache or other memory. In other words, it is possible to use the above technique to limit the memory utilization of a pass 502 such that the memory utilization fits within a particular part of the memory hierarchy (e.g., all in level 0 cache, all in level 1 cache, or the like).

A topological sort is a technique whereby nodes of a directed acyclic graph are ordered based on the directed edges of the graph. In the sort, nodes at the beginning of directed edges are always before nodes at the end of those directed edges. Any ordering for nodes that have no directed edges between them produces a valid topological sort. Thus if multiple passes 502 use a buffer 504 but are independent, and any such pass 502 could be the last one to use the buffer 504 in a valid topological sort order, then each such pass 502 is a possible last pass 502.

In some implementations, the passes 502 that exist during that lifetime include multiple independent passes 502 that all use buffer 504. By aggressively scheduling consumers of a buffer 504 to execute early, the lifetime of the buffer 504 is reduced.

In an additional scheduling technique, the command scheduler 404 automatically breaks down a large pass into several smaller passes and schedules those passes independently.

Figure 9:
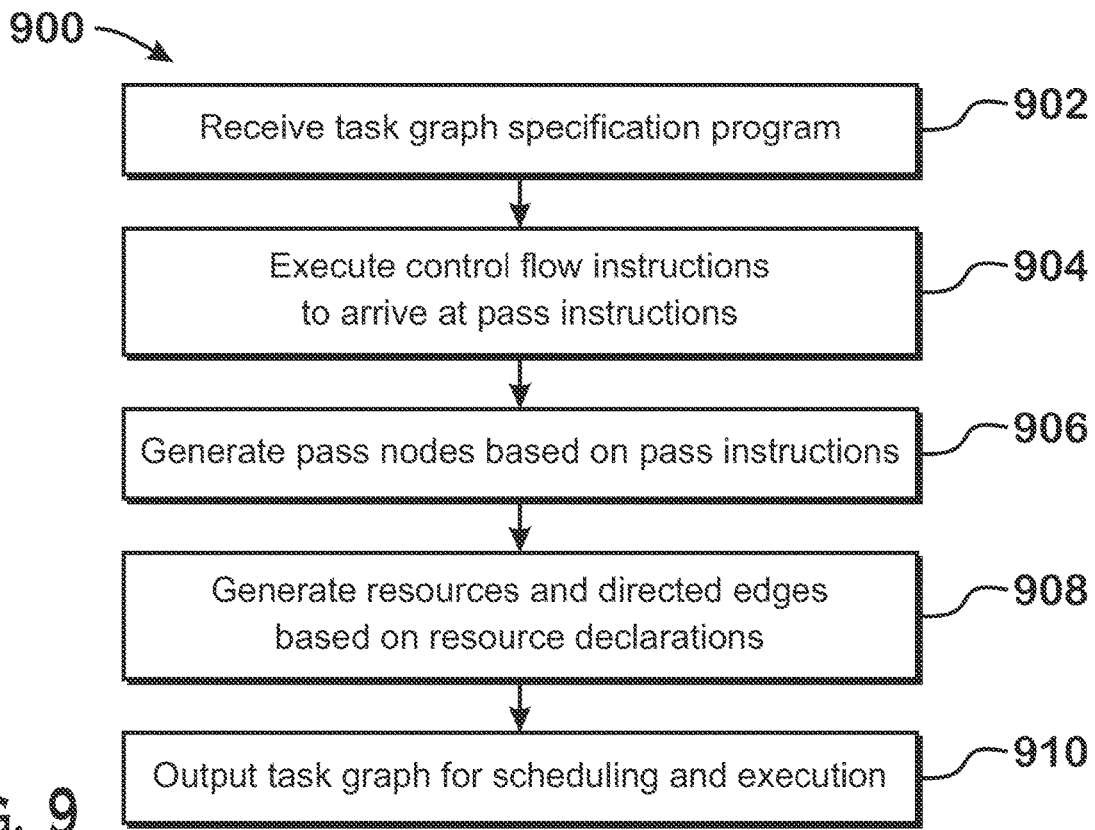
FIG. 9 is a flow diagram of a method for generating a task graph from a task graph specification program.

FIG. 9 is a flow diagram of a method 900 for constructing a task graph for scheduling, according to an example. Although described with respect to the system of FIGS. 1-8B, those of skill in the art will recognize that any system, configured to perform the steps of the method 900 in any technically feasible order, falls within the scope of the present disclosure.

The method 900 begins at step 902, where the task graph specification processor 402 receives a task graph specification program 902 for execution. The task graph specification program specifies programmatically how to generate a task graph for scheduling and execution on the APD 116. At step 904, the task graph specification program 902 executes control flow instructions as specified in the task graph specification program 902, to traverse the task graph specification program 902. These control flow instructions include instructions such as conditional instructions, loops, or the like. Note that the ordering of step 904 within FIG. 9, as before steps 906 through 910 does not necessarily mean that step 904 is performed only once in that order. Instead, it should be understood that step 904 indicates that the control flow instructions are executed as specified by the task graph specification program in whatever order they are found within that program.

At step 906, the task graph specification processor 402 generates nodes (which correspond to passes 502) based on pass instructions of the task graph specification program. In the format of FIGS. 6A to 6B, the pass instructions are the pass invocations 606. Each execution of a pass invocation, in the order specified by the control flow instructions, generates a node for the task graph. For the format of FIGS. 7A to 7B, the pass instructions are the pass blocks 710. Specifically, the task graph specification processor 402 identifies these pass blocks 710 in the manner specified elsewhere herein, and generates nodes from these pass blocks 710.

At step 908, the task graph specification processor 402 generates, in the task graph being generated, resources and directed edges between the generated nodes based on the resource utilization for each node. For a resource that is read by a node, the task graph specification processor 402 generates a directed edge pointing from that resource to the node. For a resource that is written by a node, the task graph specification processor 402 generates a directed edge pointing from the node to that resource. At step 910, the task graph specification processor 402 outputs the task graph to a command scheduler 404 for scheduling on the APD 116 or other device.

Figure 10:
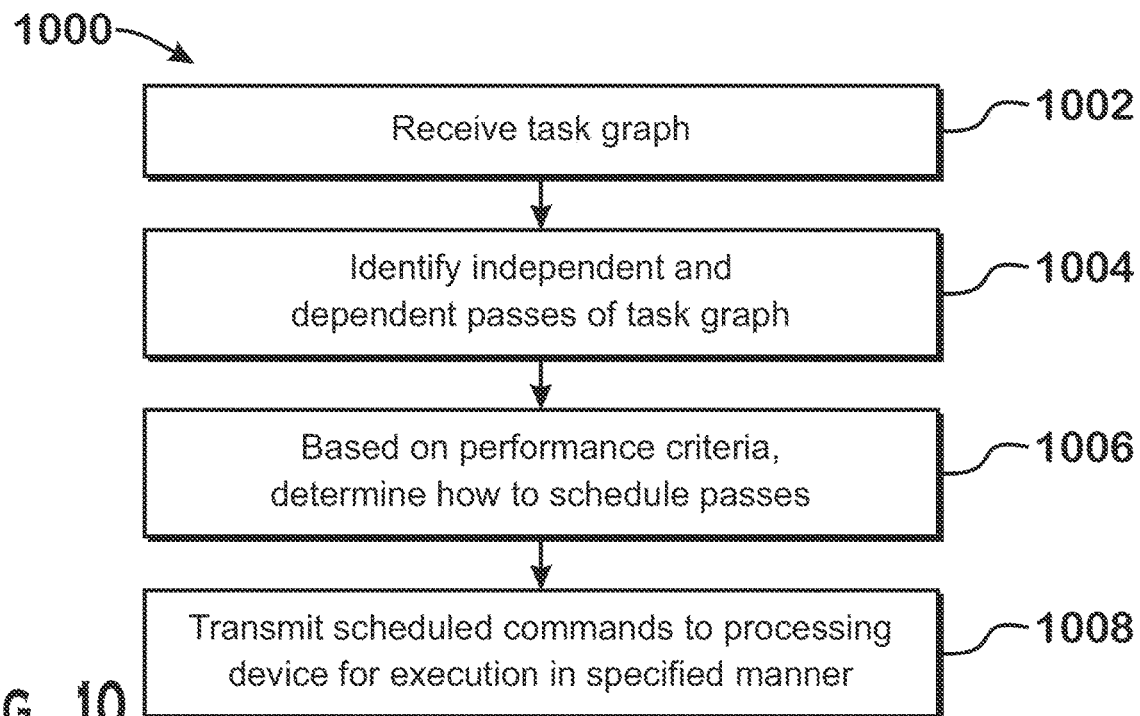
FIG. 10 is a flow diagram of a method for scheduling tasks on a processing device according to a task graph.

FIG. 10 is a flow diagram of a method 1000 for scheduling operations on a processing device based on a task graph, according to an example. Although described with respect to the system of FIGS. 1-8B, those of skill in the art will recognize that any system, configured to perform the steps of the method 1000 in any technically feasible order, falls within the scope of the present disclosure.

The method 1000 begins at step 1002, where the command scheduler 404 receives a task graph. In some examples, the task graph is generated by a task graph specification processor 402. In some examples, the command scheduler 404 is on the same processing device as the task graph specification processor 402 or on a different processing device as the task graph specification processor 402. Various example configurations are illustrated in FIGS. 4A-4C.

At step 1004, the command scheduler 404 identifies independent and dependent passes of the task graph. Techniques for identifying such passes are described elsewhere herein. At step 1006, the command scheduler 404 determines how to schedule passes for execution on the processing device, based on performance criteria. A number of techniques and considerations for scheduling the passes are described elsewhere herein, such as before the description of FIG. 9, and including descriptions related to FIGS. 8A and 8B. The scheduling step 1006 involves performing any one or more of those techniques. In general, the command scheduler 404 schedules independent passes to provide what is deemed to be a best utilization of certain resources (e.g., memory, registers, processing time, etc.) and/or other factors (e.g., hardware units) of the processing device. In addition, for passes that must occur serially due to dependencies, the command scheduler 404 causes such passes to occur serially. In some examples, the command scheduler 404 causes such passes to occur serially via a barrier command that causes all operations of one pass to complete before a dependent pass can begin completion. At step 1008, the command scheduler 404 transmits scheduled commands to the processing device for execution as scheduled.

In the disclosure provided herein, the device that ultimately executes the commands scheduled for execution of the task graph is the APD 116. However, it should be understood that implementations are contemplated by this specification in which a processing device other than that specifically described performs these commands. In some examples, a device similar to the APD 116 but without graphics capabilities (e.g., without the graphics processing pipeline 134 and capable of performing compute workloads) is the processing device. In other examples, a central processing unit is the processing device. In other examples, any other processing unit is the processing device.

Any of the units of the figures, including the processor 102, storage 106, memory 104, input driver 112, input devices 108, output driver 114, APD 116, display device 118, output devices 110, driver 122, operating system 120, applications 126, graphics processing pipeline 134, compute units 132, SIMD units 138, APD scheduler 136, and each stage of the graphics processing pipeline 134 of FIG. 3, are, where appropriate, implementable as hardware circuitry configured to perform the operations described, implementable as software executing on a processor, the software being configured to perform the operations described, or a combination of hardware and software.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for scheduling operations for a task graph on a processing device, the method comprising:
receiving a task graph that specifies one or more passes including a first pass and a second pass, one or more resources, and one or more directed edges between passes and resources, wherein the first pass and the second pass are independent passes, wherein the first pass includes execution through a graphics processing pipeline that includes a pixel shader, and wherein a resource of the resources include a buffer output by one pass of the one or more passes and input by another pass of the one or more passes;
identifying independent passes and dependent passes of the task graph;
based on performance criteria of the processing device, scheduling commands to execute the passes according to the task graph; and
transmitting scheduled commands to processing elements of the processing device for execution as schedule.

2. The method of claim 1, wherein:
identifying independent passes comprises identifying a set of passes that have no dependencies on each other.

3. The method of claim 2, wherein scheduling commands to execute the passes comprises:
scheduling at least two passes of the set of passes to execute at least partially simultaneously.

4. The method of claim 3, wherein scheduling the two passes at least partially simultaneously is performed in response to determining that one of the two passes utilizes a low number of a resource of the processing device and that the other of the two passes utilizes a high number of the resource of the processing device.

5. The method of claim 3, wherein the performance criteria include a requirement to reduce utilization of a resource of the processing device from a first utilization amount that would occur if the at least two passes were not executed at least partially simultaneously to a second utilization amount.

6. The method of claim 5, wherein the resource comprises one of memory utilization or register utilization.

7. The method of claim 5, wherein the resource comprises memory utilization for a buffer read by the two passes and scheduling the two passes at least partially simultaneously reduces the lifetime of the buffer.

8. The method of claim 1, further comprising identifying a first pass of the one or more passes that is dependent on a second pass of the one or more passes.

9. The method of claim 8, further comprising transmitting a barrier command to the processing device to cause the first pass to execute after the second pass completes.

10. The method of claim 1, wherein the scheduling is performed by a scheduler within the processing device that obtain processing metrics from the processing device without communicating with an operating system executing on a processor external to the processing device.

11. A system for scheduling operations for a task graph on a processing device, the system comprising:
a command scheduler circuit configured to:
receive a task graph that specifies one or more passes including a first pass and a second pass, one or more resources, and one or more directed edges between passes and resources, wherein the first pass and the second pass are independent passes, wherein the first pass includes execution through a graphics processing pipeline that includes a pixel shader, and wherein a resource of the resources include a buffer output by one pass of the one or more passes and input by another pass of the one or more passes;
identify independent passes and dependent passes of the task graph;
based on performance criteria of the processing device, schedule commands to execute the passes according to the task graph; and
transmit scheduled commands to processing elements of the processing device for execution as schedule.

12. The system of claim 11, wherein:
identifying independent passes comprises identifying a set of passes that have no dependencies on each other.

13. The system of claim 12, wherein scheduling commands to execute the passes comprises:
scheduling at least two passes of the set of passes to execute at least partially simultaneously.

14. The system of claim 13, wherein scheduling the two passes at least partially simultaneously is performed in response to determining that one of the two passes utilizes a low number of a resource of the processing device and that the other of the two passes utilizes a high number of the resource of the processing device.

15. The system of claim 13, wherein the performance criteria include a requirement to reduce utilization of a resource of the processing device from a first utilization amount that would occur if the at least two passes were not executed at least partially simultaneously to a second utilization amount.

16. The system of claim 15, wherein the resource comprises one of memory utilization or register utilization.

17. The system of claim 15, wherein the resource comprises memory utilization for a buffer read by the two passes and scheduling the two passes at least partially simultaneously reduces the lifetime of the buffer.

18. The system of claim 11, wherein the command scheduler is further configured to identify a first pass of the one or more passes that is dependent on a second pass of the one or more passes.

19. The system of claim 18, wherein the command scheduler is further configured to transmit a barrier command to the processing device to cause the first pass to execute after the second pass completes.

20. A non-transitory computer-readable medium storing instructions that, when executed by a processor, cause the processor to schedule operations for a task graph on a processing device, by:
receiving a task graph that specifies one or more passes including a first pass and a second pass, one or more resources, and one or more directed edges between passes and resources wherein the first pass and the second pass are independent passes, wherein the first pass includes execution through a graphics processing pipeline that includes a pixel shader, and wherein a resource of the resources include a buffer output by one pass of the one or more passes and input by another pass of the one or more passes;
identifying independent passes and dependent passes of the task graph;
based on performance criteria of the processing device, scheduling commands to execute the passes according to the task graph; and
transmitting scheduled commands to processing elements of the processing device for execution as schedule.

* * * * *